United States Patent [19]

Connor et al.

[11] Patent Number: 5,366,786
[45] Date of Patent: Nov. 22, 1994

[54] GARMENT OF DURABLE NONWOVEN FABRIC

[75] Inventors: Linda A. Connor, Atlanta, Ga.; Peter Maddern, Gwernymynydd, Great Britain

[73] Assignee: Kimberly-Clark Corporation, Neenah, Wis.

[21] Appl. No.: 884,967

[22] Filed: May 15, 1992

[51] Int. Cl.$^5$ ............. A41D 31/02; B32B 5/14; B32B 5/26; B32B 7/04
[52] U.S. Cl. .................... 428/171; 428/172; 428/198; 428/286
[58] Field of Search ............ 428/198, 286, 171, 172; 2/243 A

[56] References Cited

U.S. PATENT DOCUMENTS

| | | | |
|---|---|---|---|
| 3,207,739 | 9/1965 | Wales | 260/93.7 |
| 4,041,203 | 8/1977 | Brock et al. | 428/157 |
| 4,281,070 | 7/1981 | Sheetz et al. | 525/1 |
| 4,314,039 | 2/1982 | Kawai et al. | 525/1 |
| 4,333,979 | 6/1982 | Sciaraffa et al. | 428/179 |
| 4,379,192 | 4/1983 | Wahlquist et al. | 428/156 |
| 4,461,872 | 7/1984 | Su | 525/240 |
| 4,473,677 | 9/1984 | Pellegrini et al. | 524/109 |
| 4,514,534 | 4/1985 | DiNardo | 524/108 |
| 4,585,817 | 4/1986 | Su et al. | 524/108 |
| 4,760,113 | 7/1988 | Chiba et al. | 525/53 |
| 4,774,277 | 9/1988 | Janac et al. | 524/474 |
| 4,839,228 | 6/1989 | Jezic et al. | 428/401 |
| 4,845,137 | 7/1989 | Williams et al. | 524/108 |
| 4,874,666 | 10/1989 | Kubo et al. | 428/398 |
| 4,948,841 | 8/1990 | Kasahara et al. | 525/240 |
| 4,950,720 | 8/1990 | Randall, Jr. et al. | 525/322 |
| 5,026,778 | 6/1991 | Atsushi | 525/210 |
| 5,039,748 | 8/1991 | Wakatsuki et al. | 525/216 |
| 5,043,209 | 8/1991 | Boissé et al. | 428/233 |
| 5,057,357 | 10/1991 | Winebarger | 428/195 |
| 5,137,973 | 8/1992 | Khanna et al. | 525/177 |
| 5,188,885 | 2/1993 | Timmons et al. | 428/171 |

FOREIGN PATENT DOCUMENTS

| | | |
|---|---|---|
| 314151 | 5/1989 | European Pat. Off. . |
| 395336 | 10/1990 | European Pat. Off. . |
| 61-152810 | 7/1986 | Japan . |
| 61-155437 | 7/1986 | Japan . |

*Primary Examiner*—James C. Cannon
*Attorney, Agent, or Firm*—William D. Herrick

[57] ABSTRACT

There is disclosed a thermally bonded spunbond web of thermoplastic filaments and a nonwoven fabric laminate comprising an internal layer of meltblown thermoplastic microfibers sandwiched between two layers of spunbond thermoplastic filaments. The spunbond web and the spunbond layers of the fabric laminate consist of thermoplastic filaments which are formed from a mixture of a thermoplastic polymer and an effective amount of a nucleating agent. The layers are bonded by thermal spot bonding. In the preferred embodiment, the thermoplastic polymer is polypropylene with a melt-flow rate of at 230° C. of or greater than 12 grams per ten minutes. Also in the preferred embodiment, the nucleating agent constitutes from about 0.1 to 0.3 percent by weight of the mixture of polypropylene and nucleating agent. The nucleating agents that are useful include dibenzylidene sorbitol, di(methylbenzylidene) sorbitol, bis (p-ethylbenzylidene) sorbitol and hydrophobic, fumed silica having particle sizes up to 1 micron in diameter. The nonwoven laminate is particularly useful in manufacturing work garments and other protective apparel having enhanced durability.

5 Claims, 3 Drawing Sheets

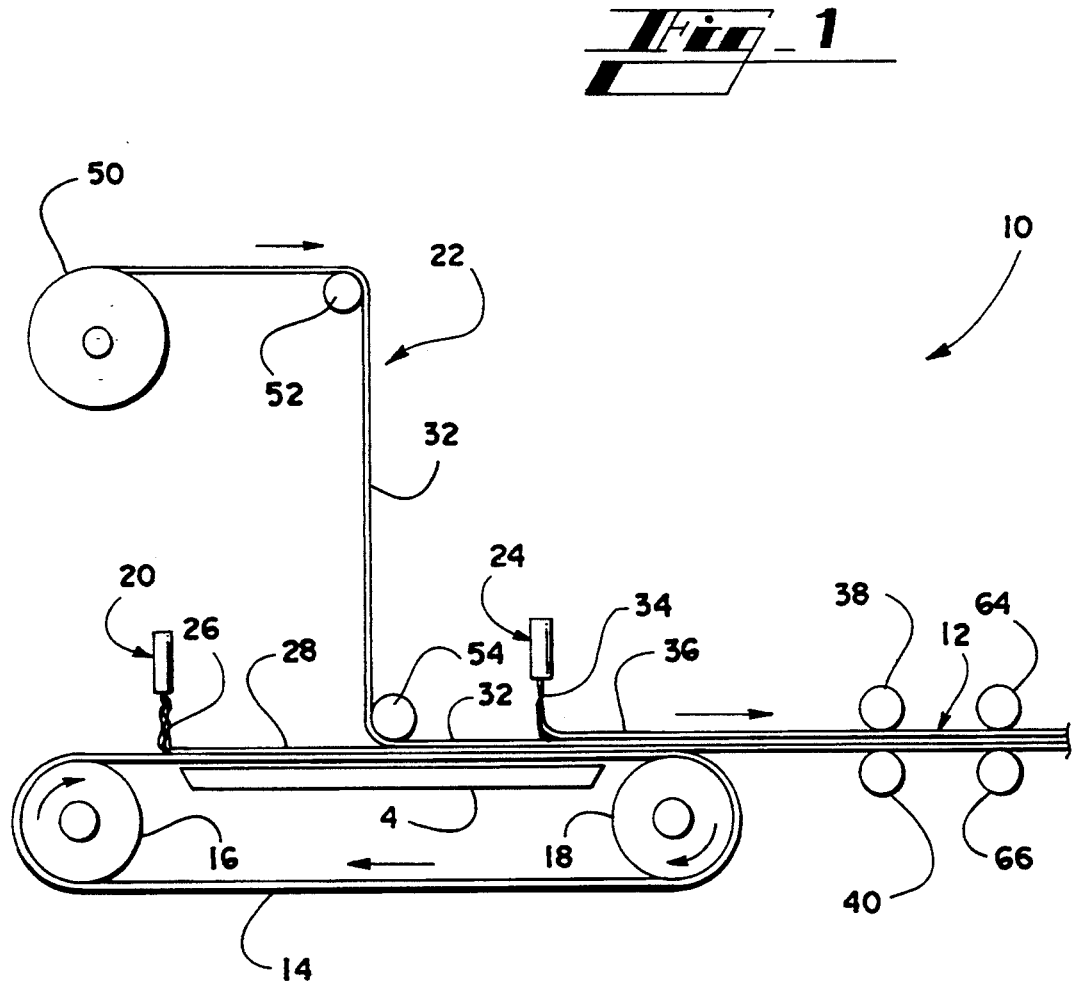
Fig_1

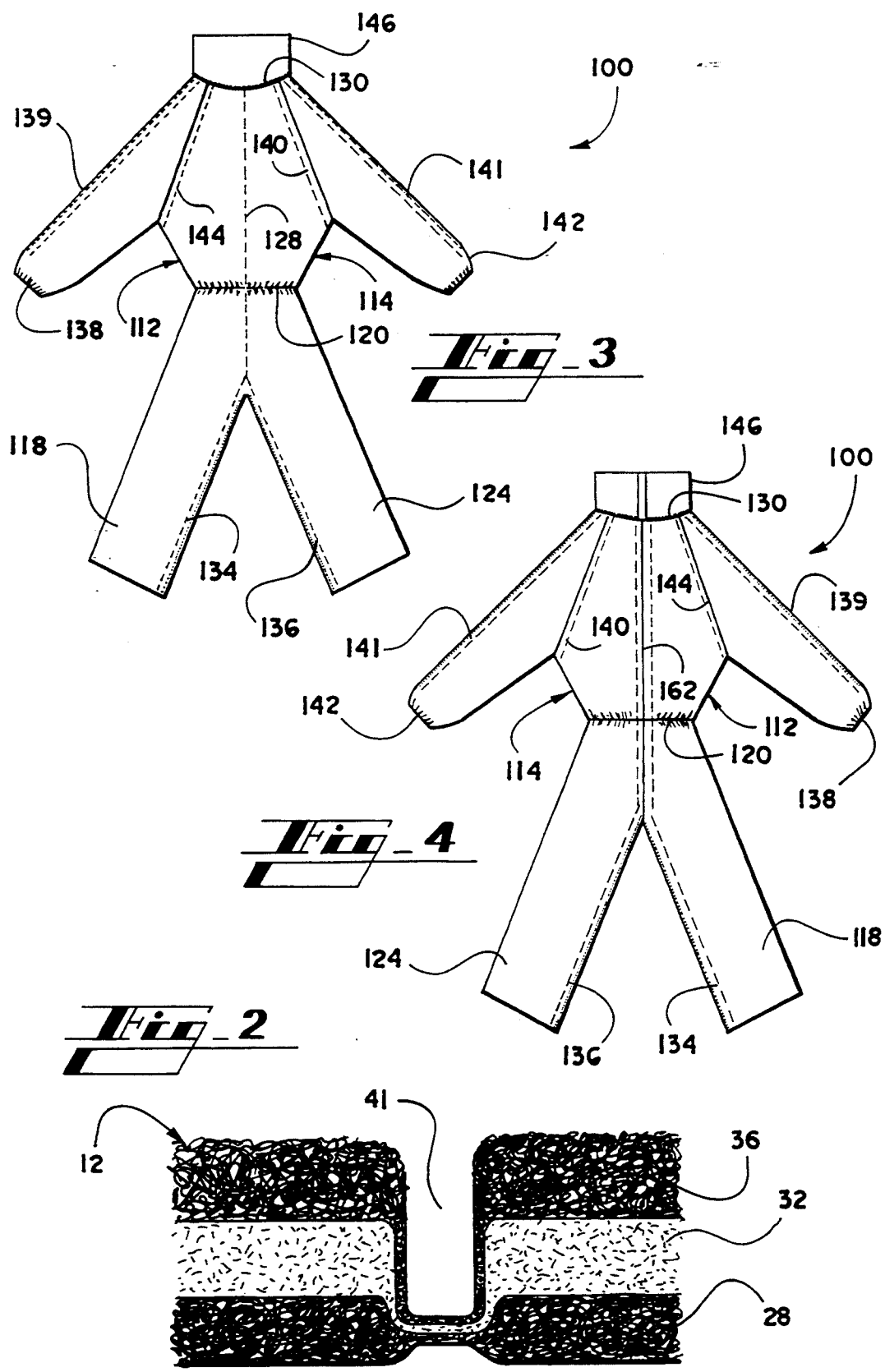

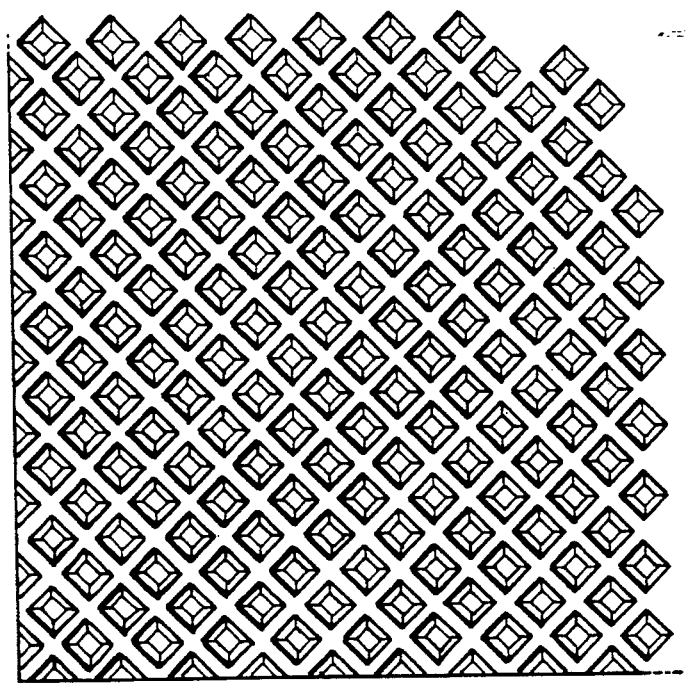
Fig_5
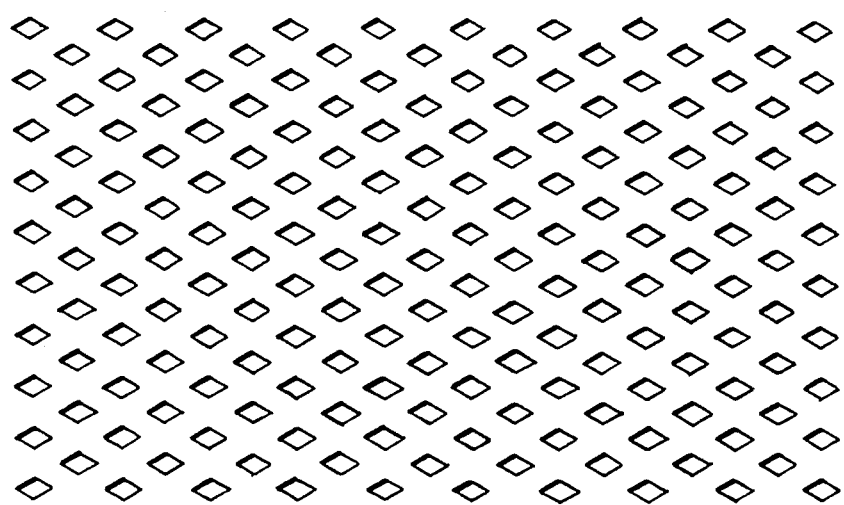
Fig_6

GARMENT OF DURABLE NONWOVEN FABRIC

BACKGROUND OF THE INVENTION

This invention relates generally to nonwoven fabrics including nonwoven webs and nonwoven laminates, and more particularly concerns a durable nonwoven fabric.

Nonwoven fabrics have found use in industry as protective work garments. Such work garments are worn to protect a worker's clothing from dirt and grease as well as to protect the worker's clothing and the worker from splashing liquids or sprays which would harm either the worker's clothing or the worker.

Nonwoven fabric work garments at the present time are constructed from a nonwoven spunbond/meltblown/spunbond laminate (SMS) comprising a meltblown layer formed from thermoplastic microfibers which layer is sandwiched between two layers of spunbond fabric formed from thermoplastic filaments. Nonwoven spunbond/meltblown fabric laminates are disclosed in Brock et al U.S. Pat. No. 4,041,203 which is assigned to Kimberly-Clark Corporation, the assignee of the present invention. The SMS fabric laminate of current work garments is made from polypropylene and may either be treated or untreated to provide good repellency against light splash and spray of commonly encountered industrial low surface tension liquids. Such polypropylene SMS work garments are sold under the mark KLEENGUARD ® by Kimberly-Clark Corporation, the assignee of the present invention. Such conventional polypropylene SMS work garments generally are only sufficiently durable to withstand a limited number of uses before they tear or pill.

The prior art discloses the addition of a nucleating agent to polypropylene to make higher tenacity polypropylene fibers. Wakatsuki et al., U.S. Pat. No. 5,039,748, discloses a high strength polypropylene fiber obtained by adding 0.05 to 10,000 parts per million by weight of vinylcycloalkane polymer to polypropylene having a molecular weight such that the intrinsic viscosity is from 0.5 to 2.5 dl/g as measured in a tetralin solution at 135° C. Particularly, the molecular weight of the polypropylene has a ratio of weight average molecular weight (Mw) to number average molecular weight (Wn) of not more than 3.5/1. The vinylcycloalkane polymer is used as a nucleating agent to strengthen the polypropylene fiber.

Asahi Chemical Ind., Japanese Patent No. 61,155,437 discloses the addition of nucleating agents, such as alumina and silica of grain size below 5 microns, sodium, potassium, aluminum salt of adipic acid, dibenzylidene sorbitol to polypropylene having a high melt index. The polypropylene has a melt index of from 70–500 g/10 rain at 230° C. The composition is used to produce polypropylene continuous filament nonwoven fabric which is said to have excellent uniformity of weight distribution of filaments. The amount of nucleating agent added to the polypropylene is from 0.05 to 0.5% by weight.

Kawai, U.S. Pat. No. 4,314,039 discloses the addition of 0.005 to 8 parts by weight of 1,3, 2,4-di(alkylbenzylidene) sorbitol with each alkyl group having 2 to 18 carbon atoms to 100 parts by weight of polypropylene. The polypropylene composition is useful in the production of molded articles having excellent transparency.

The prior art, however, does not disclose a nonwoven polypropylene fabric laminate, such as SMS, produced with a nucleating agent which fabric laminate is more durable than a conventional polypropylene SMS fabric laminate. Although the Wakatsuki et al. patent teaches an increase in the tenacity of fibers by adding nucleating agents, it does not necessarily follow, nor is it necessarily obvious, that the use of nucleating agents will give a stronger thermal-bonded spunbond web or SMS fabric laminate. In thermal-bonded continuous filament webs and in thermal-bonded fabric laminates constructed from such webs, such as thermally bonded SMS fabric laminates, studies have shown that the failure mechanism is one of brittle fracture of the fibers at the periphery of the thermal bond points. This suggests that the full strength of the fibers themselves is never completely realized in thermal-bonded webs and fabric laminates because a weakness is introduced by the thermal-bonding process at the bond points. It follows therefore that increasing fiber tenacity will not necessarily lead to a stronger thermal-bonded web or fabric laminate because the limiting factor is still the brittle bond points in the web or fabric laminate.

Consequently, there is a need for a nonwoven web and fabric laminate which has improved bonding characteristics and as a result, improved durability. Particularly, there is a need for a more durable nonwoven thermal-bonded spunbond web to be used as the outer layer of a more durable thermal-bonded fabric laminate.

SUMMARY OF THE INVENTION

It is therefore an object of the present invention to provide a thermally bonded spunbond web which has enhanced tensile strength and abrasion resistance characteristics.

It is also an object of the present invention to provide a thermally bonded nonwoven fabric laminate which has enhanced abrasion resistance and tensile strength with good barrier properties.

The foregoing objectives are obtained by a thermally bonded spunbond web comprising thermoplastic filaments which are formed from a mixture of a thermoplastic polymer and an effective amount of a nucleating agent. The foregoing objectives of the present invention are likewise obtained by a nonwoven fabric laminate which comprises an internal layer of meltblown microfibers sandwiched between two spunbond layers (SMS). The filaments of the spunbond layer are formed from a mixture of a thermoplastic polymer and an effective amount of a nucleating agent. The layers of the fabric laminate are bonded together by means of a pattern of thermal spot bonds.

In the preferred embodiments of the spunbond web and of the fabric laminate, the thermoplastic polymer is polypropylene with a meltflow rate at 230° C. of or greater than 35 g/10 min. although it is envisaged that melt flow rates of or greater than 12 g/10 min. can be used.

In the preferred embodiments of the spunbond web and of the fabric laminate, the nucleating agent constitutes from about 0.1 to 0.3 percent by weight of the mixture of the thermoplastic polymer and the nucleating agent. The nucleating agents that are useful for the present invention include dibenzylidene sorbitol, di(methylbenzylidene) sorbitol, bis (p-ethylbenzylidene) sorbitol and hydrophobic, fumed silica having particle sizes up to 1 micron in diameter. Other known inorganic and organic nucleating agents could also, no doubt, be useful. The most efficient (hence preferred) nucleating agents are the sorbitol types and, in particular, di(methylbenzylidene) sorbitol because it is widely believed that it is distributed as a polymer-like network throughout the polymer melt. This results in a large number of sites being produced for nucleation which is the cause for its enhanced efficiency over other nucleating agents.

In the present invention, the use of nucleating agents in the production of the spunbond web (or the spunbond layer for the SMS fabric laminate) did not appear to increase fiber tenacity. This is presumably because the spinning stresses alone induced extremely rapid nucleation effects from which tenacity developed. The process of crystallization during spinning is not accelerated by the nucleating agent as compared to quiescent crystallization where the nucleating agent does accelerate crystallization. It is thought that nucleating agents are not useful therefore in conferring additional tenacity over and above that which naturally occurs due to the act of spinning a spunbond filament. During thermal bonding of the filaments in the spunbond web or during thermal spot bonding of the spunbond layers in the fabric laminate, the nucleating agent is thought to promote rapid re-crystallization favoring retention of strength in the re-solidified polymer. As a result of the nucleating agent, it is also thought that the re-solidified polymer at the bond points and especially at their perimeters is tougher than it would otherwise have been had the nucleating agent been absent.

It is believed that improved bonding strength of the fabric laminate formed with a nucleating agent is the reason for improved fabric strength. In that regard, the nucleating agent additive can be considered to function as a bonding aid and not an additive for enhancing fiber strength. The Wakatsuki et al. patent does not teach the use of a nucleating agent as a bonding aid for a spunbond web or for a spunbond fabric laminate.

When the spunbond layers of the fabric laminate of the present invention are thermally bonded to the meltblown layer, the spunbond layers contribute enhanced strength and abrasion properties to the nonwoven fabric laminate. The meltblown layer contributes barrier properties to the nonwoven fabric laminate. Consequently, the nonwoven fabric laminate is particularly useful for garments to be worn by workers to protect the workers and their clothing from dirt, grease, and non-toxic liquids and sprays. The nonwoven fabric laminate of the present invention is also useful for medical apparel, such as surgeons' gowns.

In addition, the thermally bonded spunbond web with an effective amount of nucleating agent added is useful in a variety of other applications. Particularly, the spunbond web of the present invention can be used as a diaper liner. Because of its improved durability as compared to existing spunbond diaper liners, the spunbond web of the present invention can be manufactured at a lower basis weight and therefore lower cost and still provide the same durability of a heavier and more expensive conventional spunbond web.

Other objects and advantages of the invention will become apparent upon reading the following detailed description and upon reference to the drawings.

BRIEF DESCRIPTION OF THE DRAWINGS

FIG. 1 is a schematic of a forming machine for making fabric in accordance with the present invention;

FIG. 2 is a cross-section view of a fabric laminate in accordance with the present invention;

FIG. 3 is a front elevation view of a work garment made from fabric in accordance with the present invention;

FIG. 4 is a back elevation view of the work garment made from fabric in accordance with the present invention FIG. 5 is a bonding pattern that may be used with the present invention; and FIG. 6 is another bonding pattern that may be used with the present invention.

DETAILED DESCRIPTION OF THE INVENTION

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appended claims.

Turning to FIG. 1, there is shown schematically a forming machine 10 which is used to produce a nonwoven SMS fabric laminate 12 in accordance with the present invention. Particularly, the forming machine 10 consists of an endless foraminous forming belt 14. Belt 14 is wrapped around rollers 16 and 18 and is driven in the direction shown by the arrows. The forming machine 10 has three stations, spunbond station 20, barrier laying station 22, and spunbond station 24. Each station produces a layer for the fabric laminate 12. Vacuum source 4 is located under belt 14 to draw the layers of the laminate 12 onto the belt 14. It should be understood that more than two spunbond stations and more than one barrier laying station may be utilized to build up layers of higher basis weight. Alternatively, each of the laminate layers may be formed separately, rolled, and later converted to the fabric laminate off-line. In addition the fabric laminate 12 could be formed of more than or less than three layers depending on the requirements for the particular end use for the fabric laminate 12.

The spunbond stations 20 and 24 are conventional extruders with spinnercites which form continuous filaments of a polymer and deposit those filaments onto the forming belt 14 in a random interlaced fashion. The spunbond stations 20 and 24 may include one or more spinnerette heads depending on the speed of the process and the particular polymer being used. Forming spunbond material is conventional in the art, and the design of such a spunbond forming station is thought to be well within the ability of those of ordinary skill in the art. The nonwoven spunbond webs 28 and 36 are prepared in conventional fashion such as illustrated by the following patents: Dorschner et al. U.S. Pat. No. 3,692,618; Kinney U.S. Pat. Nos. 3,338,992 and 3,341,394; Levy U.S. Pat. No. 3,502,538; Hartmann U.S. Pat. Nos. 3,502,763 and 3,909,009; Dobo et al. U.S. Pat. No. 3,542,615; Harmon Canadian Patent No. 803,714; and Appel et al. U.S. Pat. No. 4,340,563. Other methods for forming a nonwoven web having continuous filaments of a polymer are contemplated for use with the present invention.

Spunbond materials prepared with continuous filaments generally have at least three common features. First, the polymer is continuously extruded through a spinnerette to form discrete filaments. Thereafter, the filaments are drawn either mechanically or pneumatically without breaking in order to molecularly orient the polymer filaments and achieve tenacity. Lastly, the continuous filaments are deposited in a substantially random manner onto a carrier belt to form a web. Particularly, the spunbond station 20 produces spunbond filaments 26 from a fiber forming polymer. The filaments are randomly laid on the belt 14 to form a spunbond external layer 28. The filament forming polymer is described in greater detail below.

The barrier layer 32 is a meltblown microfiber web. Forming nonwoven webs of thermoplastic fibers by meltblowing is well known in the art and described in various patents and publications, including *Naval Research Laboratory Report No. 4364,* "Manufacture of Super-fine Organic Fibers" by V. A. Wendt, E. L. Boon, and C. D. Fluharty; *Naval Research Laboratory Report No. 5265,* "An Improved Device for the Formation of Super-fine Thermoplastic Fibers" by K. D. Lawrence, R. T. Lukas, and J. A. Young; U.S. Pat. Nos. 3,849,241 to Buntin, et al.; 3,676,242 issued to Prentice; and 3,981,650 to Page. In general, meltblowing employs an extruder to force a hot melt of thermoplastic material through a row of fine orifices in a die tip of a die head into converging high velocity streams of heated gas, usually air, arranged on each side of the extrusion orifice. A conventional die head is disclosed in U.S. Pat. No. 3,825,380 to Harding et al. As the hot melt exits the orifices, it encounters the high velocity heated gas stream, and the stream of thermoplastic material is attenuated by the gas and broken into discrete fibers which are then deposited on a moving collector surface (not shown), usually a foraminous belt, to form a web of thermoplastic fibers. The meltblown web can then either be wound into a roll, such as roll 50, for later use, or the meltblown layer can be formed directly on spunbond web 28 in forming the SMS fabric laminate 12. As shown in FIG. 1, the meltblown web 32 is delivered to the barrier laying station 22 from roll 50. The meltblown web 32 is unwound from roll 50 and passes around guide rollers 52 and 54 prior to being laid on the spunbond layer 28.

After the meltblown barrier layer 32 has been laid on the spunbond layer 28 at the barrier laying station 22, spunbond station 24 produces spunbond filaments 34 which are deposited in random orientation on meltblown web 32 to form web 36. For a work garment fabric laminate, for example, the layers 28 and 36 each have a basis weight of preferably from about 0.4 ounces per square yard (oz/yd²) to about 0.8 oz/yd². For a work garment fabric laminate, the meltblown barrier layer has a basis weight of preferably about 0.1 oz/yd² to about 0.6 oz/yd².

The resulting fabric laminate 12 (FIG. 2) is then fed through pattern/anvil bonding rollers 38 and 40 and optionally through pattern/anvil embossing rollers 64 and 66. The surface of the bonding roller 38 has raised patterns such as spots or grids. The bonding rollers are heated to the softening temperature of the polymer used to form the spunbond layers 28 and 36 of the laminate 12. As the fabric laminate 12 passes between the heated bonding rollers 38 and 40, the material is compressed and heated by the bonding rollers in accordance with the pattern on roller 38 to create a pattern of discrete areas, such as area 41 shown in FIG. 2, which areas of the fabric laminate 12 are bonded from layer to layer. Such discrete area or spot bonding is well known in the art and can be carried out as described by means of heated rollers or by means of ultrasonic heating of the web 12 to produced discrete areas of thermally bonded filaments, fibers, and layers.

In accordance with the present invention, the three layers of laminate 12 are first point bonded together using conventional bonding rollers 38 and 40 with a pattern. If the secondary embossing rollers 64 and 66 are used, the preferred pattern for the bonding rollers 38 and 40 is a "wire weave" pattern as disclosed in Rogers U.S. Pat. Des. No. 264,512. If only the primary bonding rollers 38 and 40 are used, then a wide variety of bonding patterns can be used as desired. It is preferred that the pins on the primary pattern (roller 38) all have rounded edges in place of the usual sharp edges to minimize fracture of the polymer at the periphery of the bond point, thereby maximizing strength. If the secondary embossing pattern is used (rollers 64 and 66), the primary bond pattern (rollers 38 and 40) should have sufficiently low bond area both to maintain good drape and to minimize any reduction in the properties of breathability of the meltblown barrier layer which could result from over bonding.

After the laminate 12 has been bonded by bonding rollers 38 and 40, it may then be given a secondary surface pattern effect on the pattern side of the primary bonding pattern by passing it through pattern/anvil embossing rollers 64 and 66 which are set to apply light pressure at the softening temperature of the polypropylene. The pattern rollers 64 and 66 could, for example, impart a pattern such as Kimberly-Clark's "LT-9" (900 pins per inch) pattern which is a uniform pattern of rounded dots of 30×30 dots per square inch with 20% of the area bonded. Many combinations of primary bonding patterns with secondary embossing patterns, however, could be used to achieve the desired effect, for example, pairings of any two patterns such as Kimberly-Clark's "wire weave", "714", "EHP", "dense diamond" or others could be used. The "EHP" pattern is disclosed in Hansen & Pennings U.S. Pat. No. 3,855,046. The "714" pattern is disclosed in FIG. 5 and has a pin depth of about 0.037 inch, a pin size of about 0.022 inch, and a percentage bond area of about 13.2%. The "dense diamond" is disclosed in FIG. 6 and has a pin depth of about 0.027 inch, a pin size of about 0.017 inch, and a percentage bond area of about 15.5%. The objective of the secondary pattern when combined with the primary pattern is to introduce a more complex pattern over the fabric to create a more cloth-like visual appearance while still having good drape properties. The secondary pattern could also be introduced by surface embossing the fabric with a plastic or metal wire having a fine pattern. Such secondary embossing is disclosed in Sciaraffa et al. U.S. Pat. No. 4,333,979 which is assigned to Kimberly-Clark Corporation, the assignee of the present invention.

Finally, the laminate 12 may be impregnated (dipped and squeezed) with a fluorocarbon/antistatic treatment in accordance with conventional practice. The excess water is removed and the laminate is dried and cured. An alternative treatment consists of applying a hydrophobic fluorocarbon/antistatic treatment to the embossed surface which is the outer layer of the work garment and applying a wettable treatment to the inner layer next to the body of the wearer. This two-sided treatment can be accomplished by either a two-sided spray application of hydrophobic agent and wetting agent or by direct incorporation of these additives into the polymer melt. This further enhancement confers extra comfort because perspiration is absorbed from the skin by the side treated with the wetting agent.

In order to achieve improved durability for the laminate, the spunbond layers are formed from a mixture of a thermoplastic polymer and an effective amount of a nucleating agent. A number of polymers are considered useful in carrying out the present invention including polypropylene, polyethylene, and random copolymers based on propylene and ethylene with up to 5% by weight of ethylene. In the preferred embodiment, the thermoplastic polymer is polypropylene with a melt-flow rate at 230° C. of or greater than 35 g/10 min. although meltflow rates of 12 g/10 min. and higher can be used.

The nucleating agents that are useful for the present invention include dibenzylidene sorbitol, di(methylbenzylidene) sorbitol, bis (p-ethylbenzylidene) sorbitol and hydrophobic, fumed silica having particle sizes up to 1 micron in diameter. Other known inorganic and organic nucleating agents could also, no doubt, be useful. The most efficient (hence preferred) nucleating agents are the sorbitol types and, in particular, di(methylbenzylidene) sorbitol because it is widely believed that it is distributed as a polymer-like network throughout the polymer melt. This results in a large number of sites being produced for nucleation which is the cause for its enhanced efficiency over other nucleating agents. In the preferred embodiment, the nucleating agent constitutes from about 0.1 to 0.3 percent by weight of the mixture of the thermoplastic polymer and the nucleating agent.

In forming the fabric of the present invention, it is preferred for processing convenience that the nucleating agents are let down to the desired concentration into the polypropylene feed stock from concentrated pellets. The nucleating agents should be uniformly dispersed in the concentrate pellets and in the feed stock. It is believed that the nucleating agents serve to induce rapid re-crystallization of the melted polymer after thermal point bonding, generally increasing the toughness of the melted polymer in the weld zones.

The following examples are illustrative of the nonwoven spunbond webs and nonwoven fabric laminates in accordance with the present invention:

EXAMPLE 1

Spunbond Webs Only

Webs - spunbond webs, such as spunbond layers 28 and 36 of FIG. 1, each having a basis weight 1.35 oz-/yd$^2$ Raw Materials:
Feedstock polymer—Exxon 3445 polypropylene of MFR 35 at 230° C.—Exxon Chemical of Baytown, TX
Nucleating agent—Di(methylbenzylidene) sorbitol—Millad 3940—Milliken Chemical of Spartanburg, S.C.; and
Compounding polymer—Himont PF 301 polypropylene of MFR 35 at 230° C.—Himont Chemical of Wilmington, DE.

Process Equipment—14 inches wide (Pilot) equipment utilizing Linear Drawing System (LDS) spinning technology (generally disclosed in Appel et al U.S. Pat. No. 4,340,563)

Process parameters:
Throughput—0.7 grams per hole per min. (ghm)
Melt temperature—430° F.
Line speed—95 feet per min. (fpm)
Bonding rollers (rollers 38 and 40):
Pattern—714 spiral
Load—45 psi on both rollers The nucleating agent in this case, Millad 3940, was compounded into Himont PF301 polypropylene to a level of 10% by weight. The compounded polypropylene was then mixed with the Exxon 3445 polypropylene feedstock polymer to provide a level of additive in the final polymer of 0.25% by weight. The resulting spunbond material was run through the bonding rollers. The secondary embossing rollers were not used for the spunbond web of Example 1.

Samples 7A, 7B and 7C were made in accordance with the foregoing Example 1. The only difference in Samples 7A, 7B and 7C was the pattern bonding roller temperatures.

| Sample | Temperature of Roller 38 (°F.) |
| --- | --- |
| 7A | 270 |
| 7B | 280 |
| 7C | 290 |

Control Samples 2A and 1B were also made at the same bonding temperature and conditions as 7A and 7B respectively except that the nucleating agent Millad 3940 was not added to the polypropylene. No control was made for spunbond web 7C bonded at 290° F.

The samples were tested for tensile strength in both the machine and cross directions. The tensile tests included peak load; percentage elongation; and peak load energy according to ASTM Standards D1776, Conditioning Textiles For Testing. The results are tabulated below in Table 1.

TABLE 1

| Sample No. | Peak Load (lbs) | Elongation (%) | Peak Energy (in-lbs) |
| --- | --- | --- | --- |
| Tensile Strength/Machine Direction | | | |
| Control | | | |
| 2A | 15.5 | 44.1 | 14.4 |
| 1B | 15.8 | 49.9 | 17.7 |
| Invention | | | |
| 7A | 17.9 | 61.6 | 24.1 |
| 7B | 19.3 | 50.4 | 19.4 |
| 7C | 24.1 | 47.7 | 21.4 |
| Cross Direction | | | |
| Control | | | |
| 2A | 12.3 | 70.2 | 18.9 |
| 1B | 12.6 | 72.4 | 19.8 |
| Invention | | | |
| 7A | 13.9 | 73.4 | 20.9 |
| 7B | 16.3 | 70.5 | 23.9 |
| 7C | 18.2 | 56.3 | 20.1 |

In this example, both peak load values and peak energy values for the invention spunbond webs were higher than the corresponding values for the control spunbond webs. It was observed that when tensile stress was applied to the spunbond webs, the integrity of the bond points appeared to be retained longer in the case of the spunbond webs containing nucleating additive than in the case of the control, non-additive containing spunbond webs, apparently indicating that the bond points in the invention spundbond webs were more resistant to failure.

The spunbond webs were also tested for abrasion resistance according to ASTM Standard D4970-89, Standard Test Method For Pilling Resistance And Other Related Surface Changes Of Textile Fabrics (Martindale Pressure Tester Method). In this procedure, the pattern side of the spunbond webs was subjected to 120 abrasion cycles with a glass fiber reinforced silicone rubber abradent under a pressure of 1.3 pounds per square inch (psi) or 9 kilopascals (KPa). The specimen was examined for the presence of surface fuzzing (fiber lofting), pilling (small clumps of fibers), roping, delamination or holes and assigned a numerical rating of 1, 2, 3, 4 or 5 based on comparison to a set of standard photographs similarly numbered with "1" showing the greatest wear and "5" showing the least. The results are shown below in Table 2.

TABLE 2

| | Sample Station Number | | | |
|---|---|---|---|---|
| | 1 | 2 | 3 | 4 |
| Control | | | | |
| 2A | 1 | 1 | 1 | 1 |
| 1B | 1 | 1 | 1 | 1 |
| Invention | | | | |
| 7A | 1 | 1 | 1 | 1 |
| 7B | 1 | 3 | 1 | 1 |
| 7C | 4 | 4 | 5 | 5 |

Although there was some indication from the results that Sample 7B had greater abrasion resistance than Sample 1B, the results are not complete enough to demonstrate that the invention spunbond webs had improved abrasion resistance over the non-invention spunbond webs. However, the high abrasion resistance in Sample 7C would not have been anticipated in equivalent non-invention spunbond webs.

The spunbond webs were tested for abrasion resistance according to a different test (ASTM Standard D1175, Abrasion Resistance Of Textile Fabrics). In this test, known as the Taber test, the pattern side was subjected to 40 cycles of wear with an abrasive rubber (CS-O) wheel with a 125 gram counter weight. The abraded specimen was then compared to a set of standard photographs and assigned a rating of 1, 2, 3, 4 or 5, based on the photograph it most closely resembles with "1" showing the most abrasion and "5" showing the least amount. The specimen was rated both horizontally and vertically and the lower of the two ratings was the final rating assigned. The results are shown below in Table 3.

TABLE 3

| | Sample Station Number | | | | | |
|---|---|---|---|---|---|---|
| | 1 | 2 | 3 | 4 | 5 | Average |
| Control | | | | | | |
| 2A | 2 | 2 | 3 | 2 | 3 | 2.4 |
| 1B | 3 | 2 | 3 | 2 | 4 | 2.8 |
| Invention | | | | | | |
| 7A | 3 | 3 | 3 | 3 | 3 | 3.0 |
| 7B | 3 | 3 | 3 | 3 | 4 | 3.2 |
| 7C | 4 | 4 | 4 | 4 | 4 | 4.0 |

These results indicate an increase in abrasion resistance in the additive-containing invention spunbond webs as compared to the control spunbond webs.

Finally, the comparative wear resistance of the spunbond webs was rated using an A.A.T.C.C. Accelerator according to Kimberly-Clark, Great Britain Test Procedure KCL 050, based on AATCC Test Method 93-1978. In this test, the samples are randomly tumbled in a chamber fitted with an abrasive liner at a setting of 2000 rpm for various time periods and the loss of tensile strength due to wear action was determined. The test therefore gives an indication of the resistance of a material to breakdown due to stresses encountered by flexing in everyday wear of apparel materials.

The change in tensile strength with time was measured in terms of peak load according to ASTM Standards D1776, Conditioning Textiles For Testing, in both the machine and cross directions.

The results are shown in Table 4 below in which all strength values are expressed as a percentage of the strength of unabraded control spunbond web 2A.

TABLE 4

| | Tensile Strength Index (%) | | | | |
|---|---|---|---|---|---|
| | 0 (unabraded) | 1 | 2 | 5 | 10 |
| | Machine Direction | | | | |
| | Accelerator Wear Duration (minutes) | | | | |
| Control | | | | | |
| 2A | 100 | 51.5 | 20.5 | 10 | 10 |
| 1B | 109 | 59 | 37 | 25 | 13 |
| Invention | | | | | |
| 7A | 120.5 | 79.5 | 54.5 | 17.5 | 16 |
| 7B | 126.5 | 76.5 | 59 | 31 | 14.5 |
| 7C | 157 | 112 | 97 | 70.5 | 37 |
| | Cross Direction | | | | |
| | Accelerator wear duration (minutes) | | | | |
| Control | | | | | |
| 2A | 100 | 53 | 40 | 21.5 | 21.5 |
| 1B | 98 | 58 | 36.5 | 23 | 21.5 |
| Invention | | | | | |
| 7A | 106.5 | 75 | 50 | 29.5 | 21.5 |
| 7B | 105 | 70 | 56.5 | 40 | 26.5 |
| 7C | 126.5 | 100 | 86.5 | 68 | 48 |

The results show that the invention spunbond webs retained a higher percentage of their strength during abrasive wear than their control counterparts. A corresponding trend was also observed with peak energy values.

In order to judge whether the increased web strength originated from an increase in fiber strength, the strength properties of the fibers used in the foregoing control and invention spunbond webs were measured according to Federal Test Method 191A Method 4100 (1978). Control fiber 1 corresponded to control fabric 1B, control fiber 2 to control fabric 2A and invention fiber 7 to invention fabrics 7A, 7B and 7C.

The results are shown in Table 5 below.

TABLE 5

| | Fiber strength properites | | | | |
|---|---|---|---|---|---|
| | Peak Load (grams force) | Peak Elongation (in.) | Peak Energy (grams-in.) | Denier | Tenacity (g-f/Denier) |
| Control webs fiber | | | | | |
| 1 | 10.6 | 2.65 | 41.1 | 4.1 | 2.6 |
| 2 | 9.8 | 2.73 | 40.3 | 4.1 | 2.4 |
| Invention web fiber | | | | | |

TABLE 5-continued

| | Fiber strength properites | | | |
|---|---|---|---|---|
| | Peak Load (grams force) | Peak Elongation (in.) | Peak Energy (grams-in.) | Denier | Tenacity (g-f/Denier) |
| 7 | 8.5 | 3.65 | 44.6 | 4.1 | 2.1 |

The results show that the mechanical properties of the fibers were not improved with the addition of the nucleating agent in fiber 7. However, the elongation of the fibers apparently increased (although this was not reflected in terms of higher elongation in the webs—see Table 1).

This would indicate that the increase in mechanical properties in the invention spunbond webs in this example did not originate from higher strength fibers. This would therefore suggest that the origin of the higher web strength is due to a higher retention of fiber strength in the bond point in the case of the fibers containing the nucleating additive.

EXAMPLE 2

Spunbond Webs Only

The experiment in Example 1 was repeated on a later occasion. In making the spunbond webs, everything remained identical as in the experiment in Example 1 (raw materials, web construction, web weight, additive level, process and process conditions). The only change was that the bonding temperatures were more widely varied in order to more closely study the effect of bonding temperature on the degree of strength enhancement of the web. Samples 6-10 were made in accordance with the present invention and in accordance with the foregoing Example 2. The only difference among the Samples 6-10 was the bonding roller temperatures:

| Sample No. | Temperature Roller 38 (°F.) | Temperature Roller 40 (°F.) |
|---|---|---|
| 6 | 266 | 274 |
| 7 | 275 | 275 |
| 8 | 282 | 282 |
| 9 | 289 | 291 |
| 10 | 300 | 300 |

Control Sample 1-5 were also made. Samples 1-5 correspond to Samples 6-10 except that the nucleating agent Millad 3940 was not added to the polypropylene and there was a slight variation in the bonding roller temperatures as compared to temperatures for Samples 6-10:

| Sample No. | Temperature Roller 38 (°F.) | Temperature Roller 40 (°F.) |
|---|---|---|
| 1 | 266 | 274 |
| 2 | 274 | 276 |
| 3 | 282 | 282 |
| 4 | 290 | 290 |
| 5 | 298 | 299 |

The Samples were tested for tensile strength and for trap tear strength in both the machine and cross machine directions. The tensile tests included peak load, percentage elongation, and peak load energy according to ASTM Standards D1776, Conditioning Textiles for Testing. The trap tear test used was ASTM Standard D1117-14, Trapezoid Tearing Strength. The results are tabulated below in Tables 1 and 2.

TABLE 1

| Sample No. | Peak Load (lbs) | Elongation (%) | Peak Energy (in-lbs) |
|---|---|---|---|
| | Tensile Strength Machine Direction | | |
| Control | | | |
| 1 | 12.4 | 58.0 | 16.1 |
| 2 | 20.3 | 44.2 | 16.5 |
| 3 | 23.4 | 50.6 | 21.8 |
| 4 | 27.6 | 51.5 | 25.9 |
| 5 | 26.5 | 43.9 | 21.7 |
| Invention | | | |
| 6 | 19.8 | 41.2 | 15.8 |
| 7 | 22.6 | 56.9 | 25.0 |
| 8 | 24.6 | 53.0 | 24.7 |
| 9 | 28.4 | 58.2 | 31.1 |
| 10 | 23.4 | 47.0 | 20.8 |
| | Cross Direction | | |
| Control | | | |
| 1 | 11.6 | 62.7 | 15.3 |
| 2 | 16.8 | 65.7 | 21.3 |
| 3 | 18.0 | 58.2 | 19.2 |
| 4 | 19.3 | 56.5 | 19.1 |
| 5 | 19.8 | 48.5 | 17.5 |
| Invention | | | |
| 6 | 10.6 | 77.8 | 18.1 |
| 7 | 15.2 | 71.6 | 22.0 |
| 8 | 16.3 | 71.1 | 22.8 |
| 9 | 18.5 | 61.7 | 20.3 |
| 10 | 21.2 | 64.3 | 24.0 |

TABLE 2

| | Trap Tear (lbs) | |
|---|---|---|
| Sample No. | Machine Direction | Cross Direction |
| Control | | |
| 1 | 5.6 | 4.9 |
| 2 | 9.3 | 7.2 |
| 3 | 10.2 | 6.3 |
| 4 | 8.9 | 7.2 |
| 5 | 7.5 | 6.6 |
| Invention | | |
| 6 | 7.4 | 4.9 |
| 7 | 11.1 | 6.6 |
| 8 | 10.0 | 6.3 |
| 9 | 11.2 | 7.0 |
| 10 | 9.1 | 6.8 |

The above results show that the maximum peak load values over the range of bonding temperatures were in the invention spunbond webs (number 9 in the machine direction and number 10 in the cross direction). However, in this example, there was not a large difference between the control and corresponding invention values.

The results further show that peak energy values in both the machine and cross direction were generally higher in the invention spunbond webs than in the control materials. The maximum values were in the invention spunbond webs (number 9 in the machine direction and number 10 in the cross direction).

The tear strength values were generally higher for the invention spunbond webs but this only applied in the machine direction where the maximum value across the temperature range was invention spunbond web 9.

As in Example 1, the mechanical properties of the fibers were measured and the results shown in Table 3 below.

TABLE 3

| | Fiber strength properties | | | |
|---|---|---|---|---|
| | Peak Load (grams-force) | Peak Elongation (in.) | Denier | Tenacity (g-f/Denier) |
| Control web fiber | 10.3 | 1.45 | 3.0 | 3.4 |
| Invention web fiber | 8.4 | 1.72 | 3.4 | 2.5 |

The results again show that despite increases in the strength of the invention spunbond webs as compared to the control spunbond webs, this increased web strength does not arise from higher strength fibers. In fact, the mechanical properties of the fibers were not improved with the addition of nucleating agent.

EXAMPLE 3

SMS Fabric Laminate

Webs—laminate of spunbond/meltblown/spunbond, such as laminate 12 of FIG. 1, basis weight 1.8 oz-/yd$^2$, two spunbond layers with total basis weight of 1.35 oz/yd$^2$ and one meltblown layer with a basis weight of 0.45 oz/yd$^2$.
Raw Materials (spunbond)
  Feedstock polymer—Himont PF 301 polypropylene; nucleating agent—Di(methylbenzylidene) sorbitol—Millad 3940.
  Compounding polymer—Himont PF 301 polypropylene.
Raw Materials (meltblown)—Feedstock polymer—Himont PF 015 polypropylene of MFR 700 at 230° C.—Himont Chemical of Wilmington, DE.
Process Equipment—wide width commercial equipment utilizing Lurgi spinning technology (generally disclosed in Dorschner et al U.S. Pat. No. 3,692,618).
Process parameters: See below
Bonding rollers (rollers 38 and 40): Pattern: "EHP"

As in previous examples, the nucleating agent was again compounded into Himont PF 301 polypropylene to a level of 10% by weight. The compounded polypropylene was then mixed with the Himont PF 301 feedstock polymer to provide a level of additive in the final polymer of 0.2% by weight. The additive was present only in the spunbond layers. The resulting laminate was then run through the bonding rollers. The secondary pattern rollers were not used for the fabric laminate of Example 3.

Control fabric laminate roll series 301487 to 301491 were made without additive. Fabric laminate roll series 301513 to 301521 were made in accordance with the present invention in accordance with foregoing Example 3, the conditions having been optimized for maximum fabric laminate strength. The only difference in the conditions was a 13° F. higher bonding temperature in the case of the invention fabric laminate.

The samples were tested for tensile strength, peak energy, elongation to failure and tear strength and the tensile results are tabulated below in Table 1.

TABLE 1

| | Peak Load (lbs) | Elongation (%) | Peak Energy (in-lbs) |
|---|---|---|---|
| Tensile strength | | | |
| Machine Direction | | | |
| Control (Series 301487–301491) | 26.7 | 60.4 | 27.8 |
| Invention (Series 301513–301521) | 30.4 | 64.8 | 33.7 |
| Cross Direction | | | |
| Control | 31.4 | 56.5 | 31.2 |
| Invention | 35.4 | 60.5 | 38.2 |

There was no change in trap tear values in this case. Abrasion resistance was measured according to the Taber method. There was no change in abrasion resistance apparent with this test. Finally, water repellency, as measured by hydrostatic head, was unchanged indicating that the additive did not affect the barrier properties of the fabric laminate negatively.

The results in Table 1 showed that with suitable optimization of calender temperatures the additive increased both the tensile strength and energy of the fabric laminate. No control was attempted at the elevated calender temperature because it was known that in regular production, the fabric laminate would have an unacceptable tendency to stick to the rollers and also pinholes would be produced at the bond points. Indeed, when the additive was initially removed from the fabric laminate, it was noticed that the fabric laminate began to show signs of sticking to the rollers and the calender temperature was accordingly reduced to compensate.

It should be noted that the increased strengths could only be achieved at the elevated bonding temperature. This indicates a greater temperature resistance for fabric laminates containing the additive compared to fabric laminates without.

The foregoing bonding temperature increase was the maximum that could be achieved within the time constraints of the trial. It is possible that greater strength increases could have been achieved at even higher temperatures, with optimization of the latter.

Again, the bond points in the invention fabric laminate appeared more resistant to fracture than the bond points in the control fabric laminate. This was confirmed by high magnification video photography of the failure of the fabric laminates due to applied stress.

The fabric laminate 12 of the present invention is useful among other things in the manufacture of work garments such as garment 100 shown by way of example in FIGS. 3 and 4. FIG. 3 is a back view of the garment 100 and FIG. 4 is a front view of the garment 100. The garment 100 comprises a neck piece 146, a right arm piece 142, a left arm piece 138, a right body piece 114 which includes right leg piece 124, and a left body piece 112 which includes left leg piece 118. The garment 100 is constructed by first forming the arms out of right arm piece 142 by means of seam 141 and the left arm piece 138 by means of seam 139. The right leg 124 is joined along seam 136 and the left leg 118 is joined along seam 134. The two body panels 114 and 112 are joined along backseam 128 and by means of zipper 162 (FIG. 4). The left arm 138 is then joined to the left body panel 112 along seam 144. The fight arm piece 142 is joined to the right body panel 114 along seam 140. The neck piece 146 is attached to the arms and the body pieces along seam 130. Elastic is provided at the waist 120. Because of the durability of the laminate 12 which is used in making the garment 100, the garment 100 is more durable than similar garments constructed from conventional SMS fabric laminates.

We claim:

1. A garment for protecting a worker constructed from a fabric comprising a durable nonwoven laminate comprising at least one spunbond layer comprising thermoplastic filaments formed from a mixture of a thermoplastic polymer and an effective amount of a fumed silica nucleating agent having particles sizes up to 1 micron in diameter and at least one layer of a meltblown web of thermoplastic microfibers, wherein the layers of the laminate are thermally bonded together in discrete areas.

2. The garment of claim 1, wherein the nucleating agent constitutes 0.1 to 0.3 percent weight of a mixture.

3. The garment of claim 1, wherein the laminate comprises three layers: one meltblown layer laminated between two of the spunbond layers.

4. The garment of claim 3, wherein the thermoplastic polymer has a melt flow rate at 230° C. of or greater than 12.

5. The garment of claim 4, wherein the thermoplastic polymer is selected from the group consisting of polypropylene, polyethylene, and random copolymers based on propylene and ethylene with up to 5% by weight of ethylene.

* * * * *